United States Patent Office

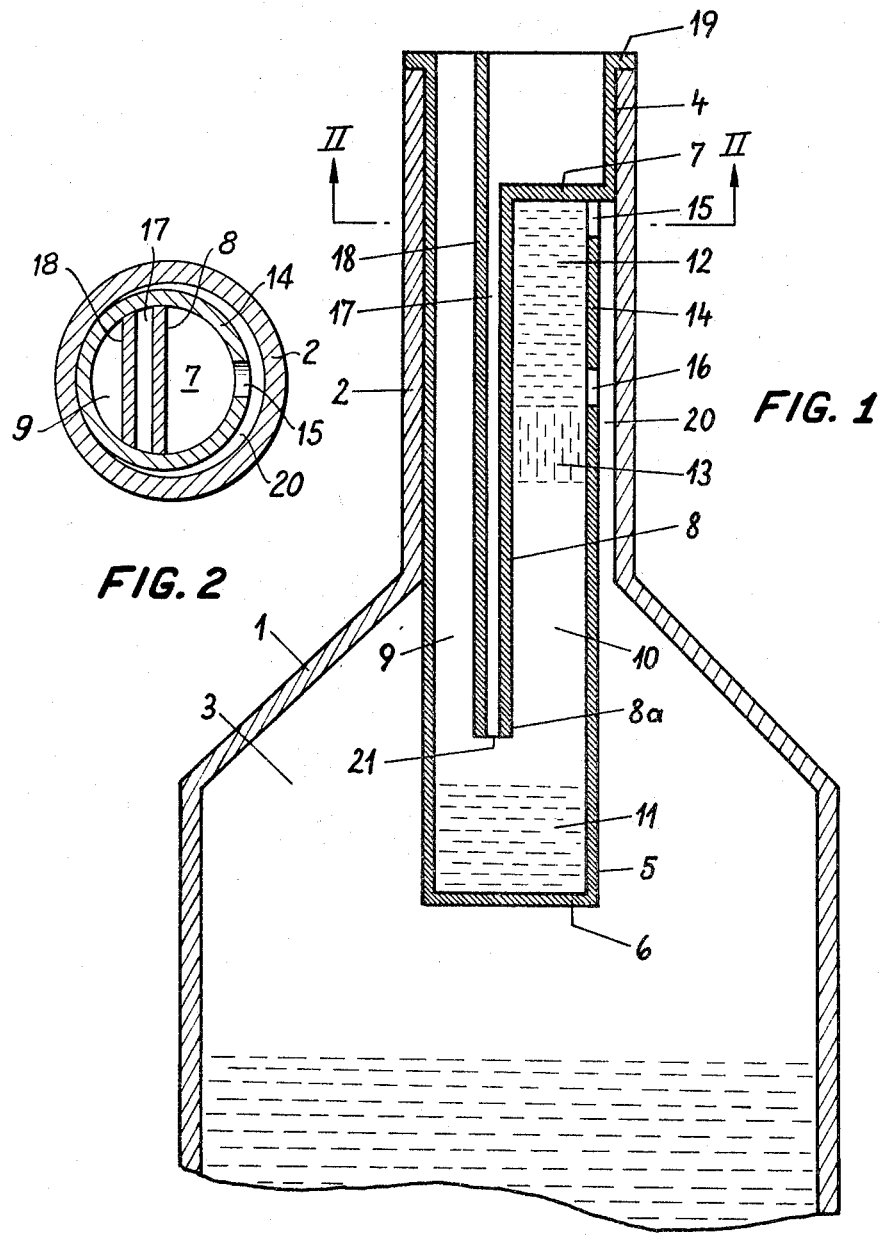

3,288,335
Patented Nov. 29, 1966

3,288,335
METERING DEVICE FOR DISPENSING IDENTICAL QUANTITIES OF LIQUIDS FROM LIQUID CONTAINERS
Heinz Steffens and Willi Steffens, both of Eitorf, Germany, assignors to Friedrich Stübbe, Vlotho (Weser), Germany
Filed Nov. 24, 1964, Ser. No. 413,527
Claims priority, application Germany, Dec. 4, 1963, St 21,413
2 Claims. (Cl. 222—455).

The present invention relates to a metering device for dispensing quantities of liquids of identical volume from liquid containers which are provided with an opening into which the tubular metering device may be inserted, said opening being adapted to be closed by said metering device which seals with regard to the wall of the container.

Liquids of various types are packed and sold as a rule in containers such as bottles, canisters, or the like. When using liquids, it is frequently necessary each time to dispense a certain identical quantity of liquid from the liquid container. For instance, it may be called for to withdraw from the container a certain number of cubic centimeters, a certain number of drops, half a teaspoonful, or the like. In this connection, there exists the possibility that when tilting the container, the liquid is not dispensed in drops but flows out as a thin stream. Furthermore, there exists the possibility that no precision measuring vessel is available or that spoons of different sizes may be used. Actual tests have proved that when the withdrawal of a quantity of liquid is called for which equals the volume of half a teaspoon, considerable variations have been encountered in view of the different sizes of teaspoons, so that errors have been made which vary from a quantity which was too small by 58% to a quantity which was too great by 46%. When the same tests were carried out with tablespoons, the variations were even greater and it was found that quantities were dispensed which were too great by 78%. When dispensing the quantity called for to equal that of an entire tablespoon, the metered out quantities differed from each other by 62%.

Therefore, the liquid containers have been equipped with droppers, or measuring cups, or measuring spoons. Droppers, however, have a well-known drawback, viz. that frequently the liquid will not leave the dropper or the liquid leaves the dropper in such a fast sequence that there exists the danger of making an error in counting the drops. When metering out the liquid by means of measuring cups or measuring spoons, likewise considerable variations occur. Tests have proved that with measuring spoons, the metered out quantities differed from each other by 68%, and that with measuring cups, differences up to 79% were encountered. These measuring errors are caused by the different ways the measuring cups or measuring spoons are held, and by the angle at which the marking of the measuring cup or measuring spoon is observed.

Thus, with the above-mentioned methods of metering liquids from a liquid container, considerable variations may occur with regard to the prescribed quantity to be dispensed. This can be highly disadvantageous and even dangerous when the liquid to be dispensed is a medicine, inasmuch as it may either delay healing process or may cause health damage.

In an effort to obviate the above-mentioned drawbacks, metering devices have been developed which are equipped with mechanical auxiliary means such as valves, balls, and the like and which are actuated by tilting the liquid container back and forth so as alternately to open and close the inlet and outlet openings of a measuring chamber the volume of which corresponds to the volume of the liquid to be dispensed each time. These metering devices, however, have the drawback that the valves, or the like, clog up when a sticky liquid or a liquid is involved which quickly dries, and the result in such an instance will be that the metering device no longer works properly. In addition thereto, devices of this last-mentioned type are relatively complicated and expensive so that they are unsuitable for most liquid containers which as a rule are used merely as packing and which are discarded after the liquid therein has been used up. Consequently, such expensive metering devices are unsuitable for containers of this type.

It is, therefore, an object of the present invention to provide a metering device for successively dispensing equal quantities of liquid, which will overcome the above-mentioned drawbacks.

It is another object of this invention to provide a metering device of the above-mentioned general type, which, while permitting the successive dispensing of identical quantities of liquid, is inexpensive to manufacture.

It is still another object of this invention to provide a metering device as set forth above, which will permit a precise metering out of identical quantities of liquid without the employment of mechanical means as, for instance, valves or the like.

For the sake of completeness, it may be mentioned that metering devices have become known which do not employ mechanical auxiliary means and which have a metering chamber which, by tilting the liquid container back and forth, are alternately filled from the container and discharged through a discharging opening. Metering devices of this type, however, have the drawback that when the liquid container is only slightly filled, no liquid can be dispensed therefrom, in other words, the container cannot be fully discharged in metered out quantities. These known metering devices also have the drawback that when the container has been completely filled, an uninterrupted liquid stream will be dispensed rather than a metered quantity. Above all, however, it is impossible that these devices could meter out and dispense always the same volume of liquid. Instead, considerable variations in volume occur which depend on the degree of filling of the liquid container and which are due to the "free liquid."

By "free liquid" is meant that quantity of liquid which will flow out from a closed vessel entirely or partially filled with liquid without air entering into the vessel. If, for instance, the neck of a bottle is closed by a stopper, and the stopper is provided with a narrow bore which on one hand is wide enough to permit liquid to flow therethrough but on the other hand is so narrow that no air can enter the bottle therethrough when liquid is being dispensed from the bottle, it will be appreciated that when the bottle is placed upside down, liquid will flow out from the bottle without air entering said bottle until the outer atmospheric pressure on one hand and the air pressure and pressure of the liquid column in the bottle, balance each other. The quantity of liquid which under these conditions is dispensed, is called the "free liquid." The outflowing quantity of free liquid is thus dependent on the specific weight of the liquid, on the height of the liquid column in the bottle, and on the quantity of air in the bottle which expands in view of the free liquid being dispensed and which is under a subatmospheric pressure. Depending on the degree of filling of a liquid container, also the quantity of free liquid will vary. This variable magnitude cannot be eliminated with the above-described heretofore known metering devices.

It is, therefore, a further object of this invention to provide a metering device which will eliminate the free liquid so that independently of the degree of filling of the liquid container, there will always be dispensed the identical quantity of liquid.

The aforementioned and other objects of the present invention will appear more clearly from the following specification in connection with the accompanying drawing diagrammatically illustrating in section a vessel equipped with a metering device according to the present invention.

The metering device according to the present invention is characterized primarily in that the tubular metering device has its inner end which extends into the liquid container or vessel closed by a bottom and has its interior provided with two passages extending in axial direction of the vessel, said passages being separated from each other by a partition. This partition is spaced from the said bottom of the tubular metering device so that at the closed inner end of the metering device between the adjacent end of said partition and the said bottom, there is formed a collecting chamber which interconnects the two passages. The volume of said collecting chamber equals at least the volume of the quantity of liquid to be metered out. Furthermore, one of said passages, viz. the one which serves as dispensing passage, is opened toward the outer end of the metering device, whereas the other passage is closed with regard to the outer end of the metering device by a transverse wall and is connected with the interior of the container or vessel through at least two openings which are arranged in the outer wall of said dispensing device and are spaced from each other in axial direction of said dispensing device. In the last-mentioned passage, between the transverse wall and that one of the two bores which is farthest from said transverse wall when looking in axial direction of the said last-mentioned passage, there is formed a dispensing chamber the volume of which equals the volume of the quantity of liquid to be metered out. In the last-mentioned passage, between said last-mentioned bore and the end of said partition, there is provided a collecting chamber the volume of which equals at least the volume of the maximum occurring free liquid.

FIGURE 1 is a vertical section of the metering device in a container.

FIGURE 2 is a cross-section on line 2—2 of FIGURE 1.

Referring now to the drawing in detail, there is shown a bottle 1 provided with a bottle neck 2 into which has been introduced a tubular metering dispensing device according to the present invention. As will be seen from the drawing, the metering dispensing device extends into the container chamber 3 for the fluid, and the opening of bottle 1 or more specifically, bottle neck 2 is closed by the metering device which seals with regard to the container wall. In the particular embodiment shown in the drawing, the seal is so effected that the upper outer end 4 of the metering device closely and tightly engages the wall of bottle neck 2.

The tubular metering dispensing device has its inner end 5 which extends into bottle 1 closed by a bottom 6. In the interior of the metering device there are provided two passages 9 and 10 which extend in axial direction of the bottle neck and which are separated from each other by a partition 8. Partition 8 extends transversely between opposite sides of the tubular device and has its end spaced from bottom 6 by such a distance that at the closed inner end 5 of the metering device between the partition wall end 8a and the bottom 6 there is formed a collecting chamber 11 establishing intercommunication between the two passages 9, 10. The volume of collecting chamber 11 equals at least the volume of the quantity of liquid to be metered out. Passage 9 forms the discharging passage and is open toward end 4 of the dispensing device. The other passage 10 is closed ttoward the outer end 4 of the metering device by a transverse wall 7 and forms a closed chamber. The outer tubular wall 14 of passage 10 has two openings 15 and 16 which are spaced from each other in axial direction of passage 10. As will be seen from the drawing, passage 10 communicates with the container chamber 3 through the two openings 15 and 16. To this end, the outer wall 14 of passage 10 is spaced from the adjacent container wall portion so that between the latter and the outer wall 14 there is formed an intermediate chamber 20. Between transverse wall 7 and that opening which is farthest way from transverse wall 7 when looking in axial direction of the bottle neck, in other words, between wall 7 and bore 16, passage 10 forms a metering chamber the volume of which equals the volume of the quantity of liquid to be dispensed. The magnitude of the quantity of liquid to be dispensed is thus dependent on the cross-section of passage 10 and on the distance between the transverse wall 7 and the opening 16. Furthermore, between opening 16 and the end 8a of partition 8, passage 10 forms a collecting chamber 13 the volume of which at least equals half the maximum occurring free liquid. The distance between opening 16 and partition end 8a, which means the length of passage 10, is therefore to be dimensioned so great that the collecting chamber 13 will be able to receive half of the maximum quantity of free liquid, while the magnitude of the free liquid will be independent of the magnitude of vessel 1 and will also be independent of the above-mentioned factors.

*Operation*

When bottle 1 is tilted, liquid will flow from container chamber 3 through the intermediate chamber 20 and opening 15 into passage 10, and at the same time the displaced air can escape from passage 10 through opening 16 into container chamber 3 until the metering chamber 12 is filled with the desired quantity of liquid to be dispensed. This quantity of liquid is indicated in the drawing by horizontal dashes. As soon as the metered out quantity of liquid is metering chamber 12 has closed the opening 16, no further air can enter container chamber 3. Consequently, from now on only free liquid passes into collecting chamber 13, and only half the quantity of free liquid, which is indicated in the drawing by vertical dashes. This is due to the fact that this quantity can no longer be discharged, and therefore will balance the other half of free liquid in container chamber 3. Due to the discharge of the free liquid from container chamber 3 into collecting chamber 13 of passage 10, the air in container chamber 3 has been expanded so that it will be under the above-mentioned subatmospheric pressure. When now vessel 1 is tilted back from the above-described tilted position in clockwise direction into the vertical position shown in the drawing, the air which is under a subatmospheric pressure will, during this backward tilting of the vessel, draw liquid from passage 10 through opening 16 into container chamber 3 until the air in container chamber 3 is no longer under subatmospheric pressure. This means that precisely half of the free quantity of liquid will be drawn back from collecting chamber 13. Consequently, no more or no less than the metered out quantity of liquid can flow from the metering chamber 12 through passage 10 into collecting chamber 11. Collecting chamber 11, therefore, will now contain a quantity of liquid which corresponds precisely to the quantity of liquid to be metered out. This quantity of liquid will, during the next tilting of the vessel, i.e. when tilting vessel 1 in counter-clockwise direction, flow through passage 9 and will be dispensed by the dispensing device. Simultaneously, in passage 10 will take place the next metering operation in the above-described manner. Consequently, the metering device will always dispense quantities of identical volume.

At the same time, the metering device also prevents an unlimited discharge of the liquid if accidentally, the vessel 1 should be tipped over or held unduly inclined. As will be evident from the above, at the worst, only that quantity of liquid could run out accidentally, under the above-mentioned circumstances, which is in the collecting chamber 11.

When employing the metering device according to the invention for medicine, the metering device will also represent a safeguard against older or sick people handling the bottle carelessly or accidentally, in an undesired manner. It is never possible to dispense more liquid than is desired for each dispensing operation. An increased metering out in view of poor eyesight, by making a mistake in counting drops or by using differently sized measuring instruments such as teaspoons, tablespoons, measuring cups, measuring spoons or droppers, will be impossible with the metering device according to the invention.

When medicine is involved, the quantity to be taken by adults frequently is a multiple of that to be taken by children. In such instance, the metering device is so designed that it will each time dispense the medicine in the quantity prescribed for children, and adults will in such an instance have to tilt the vessel several times corresponding to the multiple children's portion to be taken by the adult.

The metering device according to the invention may be produced, for instance, of synthetic material so that it may be employed in connection with liquid containers which are discarded after the liquid has been consumed. The magnitude of the openings 15 and 16 depends on the viscosity of the liquid to be metered out. It will be appreciated that when the openings are too small with regard to the viscosity of the liquid, the liquid cannot pass through the openings. If inversely, with a thin flowing liquid, the openings are too large, simultaneously liquid can flow out and air can enter, as is the case, for instance, with bottles having a wide neck.

According to a further feature of the invention, one of the openings, viz. opening 15, is arranged directly at the point where that portion of the metering device which seals with regard to the wall of vessel 1, extends to the outer wall 14 of the metering device. In this way, vessel 1 may be completely emptied so that the liquid, up to the last minute, can be discharged in metered quantities of the same volume.

According to a further feature of the present invention, the metering device is provided with a venting tube 17 which extends from the outer end 4 of the metering device into the collecting chamber 11. Expediently, the venting pipe 17 is formed by partition 8 and a further wall 18. The mouth 21 of venting pipe 17 is arranged in spaced relationship to bottom 6 in such a way that on one hand it is located above the liquid level in collecting chamber 11 when bottle 1 is in its upright position, and on the other hand it is located above the liquid level in collecting chamber 13 when bottle 1 is in its upside down position so that under no circumstances will the liquid be able to escape through venting pipe 17. The employment of a venting pipe is advantageous particularly with viscous liquids which could close off the entire cross-section of discharge passage 9 whereby, in collecting chamber 11 and in passage 10 a subatmospheric pressure could develop which could affect the discharge of the metered quantity of liquid through passage 9 and could disturb the operation of the metering device.

According to a further development of the present invention, the metering device is provided with a collar 19 resting from the outside on the margin of the neck opening of vessel 1. When the metering device does not protrude from vessel 1, the said collar 19 may be used as seal when a cover is screwed onto vessel 1.

The metering device according to the invention makes it possible also from large liquid containers to dispense small quantities of liquids of precisely the same volume. For instance, with a bottle having a content of one gallon, a free quantity of liquid of 8 cubic centimeters may be discharged. With a metering device according to the invention, in view of the elimination of this free quantity of liquid, it is possible to meter and to dispense smallest quantities of liquids as, for instance one-half cubic centimeter or one cubic centimeter and to do so regardless of the degree of filling of the bottle.

It is, of course, to be understood, that the present invention is, by no means, limited to the particular arrangement shown in the drawing, but also comprises any modifications within the scope of the appended claims.

What we claim is:

1. A tubular dispensing device for insertion into the opening of a liquid container for dispensing equal volumes of liquid from said container, said tubular device being closed at its inner end and having a partition extending transversely between opposite sides of said tubular device and axially from its outer end with the inner end of the partition spaced from the closed inner end of the tubular device, said device being open at the outer end on one side of said partition to form a discharge passage and closed by a transverse wall on the other side of the partition to form a closed chamber inwardly of the outer end, the tubular wall of said closed chamber having axially spaced openings inwardly of said transverse wall to form a metering chamber between the inner one of said openings and said transverse wall having a volume equal to the quantity of liquid to be dispensed, said partition being spaced from the closed end of said device sufficiently to define a receptacle beyond said partition of a volume at least as great as the volume of said metering chamber, said partition extending axially inwardly beyond said inner opening a distance sufficient to form a collecting chamber in said closed chamber inwardly of said inner opening of a volume to receive free liquid when said container is inverted and the liquid therein fills said metering chamber and exerts pressure to raise the level of said liquid above said inner opening, so that when said container is tilted with its discharge passage on the lower side, liquid will flow from said receptacle and the liquid will flow into said metering chamber as said container is inverted and beyond said inner opening until the weight of the liquid and the reduced pressure of the air above the liquid are in equilibrium.

2. A dispensing device as defined in claim 1, in which the outer of said axially spaced openings is adjacent the transverse wall of said closed chamber.

References Cited by the Examiner

UNITED STATES PATENTS 2,664,228  12/1953  Radeloff et al. _____ 222—455

FOREIGN PATENTS 4,936  2/1913  Great Britain.

ROBERT B. REEVES, *Primary Examiner.*

HADD S. LANE, *Examiner.*